United States Patent
Schulze et al.

(10) Patent No.: US 10,762,071 B2
(45) Date of Patent: Sep. 1, 2020

(54) VALUE-ID-BASED SORTING IN COLUMN-STORE DATABASES

(71) Applicant: SAP SE, Walldorf (DE)

(72) Inventors: Robert Schulze, Walldorf (DE); Thomas Peh, Walldorf (DE)

(73) Assignee: SAP SE, Walldorf (DE)

( * ) Notice: Subject to any disclaimer, the term of this patent is extended or adjusted under 35 U.S.C. 154(b) by 393 days.

(21) Appl. No.: 15/363,274

(22) Filed: Nov. 29, 2016

(65) Prior Publication Data

US 2018/0150494 A1 May 31, 2018

(51) Int. Cl.
*G06F 7/00* (2006.01)
*G06F 16/22* (2019.01)

(52) U.S. Cl.
CPC ........ *G06F 16/2272* (2019.01); *G06F 16/221* (2019.01); *G06F 16/2228* (2019.01)

(58) Field of Classification Search
CPC ......... G06F 17/30321; G06F 17/30315; G06F 17/30336; G06F 16/2272; G06F 16/2228; G06F 16/221
USPC ................................ 707/741, 742, 753, 752
See application file for complete search history.

(56) References Cited

U.S. PATENT DOCUMENTS

| | | | |
|---|---|---|---|
| 8,583,655 B2 | 11/2013 | Elzinga | |
| 10,162,598 B2 * | 12/2018 | Kaushik | ............ G06F 7/24 |
| 2006/0112097 A1 | 5/2006 | Callaghan et al. | |
| 2008/0294676 A1 | 11/2008 | Faerber et al. | |
| 2014/0101167 A1 | 4/2014 | Qin | |
| 2015/0178305 A1 * | 6/2015 | Mueller | ............ G06F 16/221 |
| | | | 707/693 |

FOREIGN PATENT DOCUMENTS

EP 2889787 7/2015

OTHER PUBLICATIONS

Funke et. al., "Compacting Transactional Data in Hybrid OLTP &OLAP Databases," *Proc. VLDB Endowment*, vol. 5, No. 11, pp. 1424-1435 (Aug. 2012).

Grund et al.: "HYRISE—a Main Memory Hybrid Storage Engine," *Proceedings of the VLDB Endowment*, vol. 4, No. 2, pp. 105-116 (Aug. 2011).

(Continued)

*Primary Examiner* — Md I Uddin
(74) *Attorney, Agent, or Firm* — Klarquist Sparkman, LLP

(57) ABSTRACT

Innovations in performing sort operations for dictionary-compressed values of columns in a column-store database using value identifiers ("IDs") are described. For example, a database system includes a data store and an execution engine. The data store stores values at positions of a column. A dictionary maps distinct values to corresponding value IDs. An inverted index stores, for each of the corresponding value IDs, a list of those of the positions that contain the associated distinct value. The execution engine processes a request to sort values at an input set of the positions and identify an output set of the positions for sorted values. In particular, the execution engine iterates through positions stored in the lists of the inverted index. For a given position, the execution engine checks if the given position is one of the input set and, if so, adds the given position to the output set.

30 Claims, 10 Drawing Sheets software 180 implementing one or more innovations for value-ID-based sorting in column-store databases

(56) References Cited

OTHER PUBLICATIONS

Krueger et. al., "A Case for Inverted Indices for In-Memory Databases," *Fourth International Conference on Advances in Databases, Knowledge, and Data Applications*, pp. 15-24 (Feb. 2012).
Plattner, "A Common Database Approach for OLTP and OLAP Using an In-memory Column Database," *Proc. 2009 ACM SIGMOD International Conference on Management of Data*, 7 pp. (Jun. 2009).
Poess et. al., "Data Compression in Oracle," *Proc. VLDB Endowment*, 11 pp. (Sep. 2003).
Powers, "Parallelized QuickSort and RadixSort with Optimal Speedup," *Proc. International Conference on Parallel Computing Technologies*, 10 pp. (1991).
Raman et al., "DB2 with BLU Acceleration: So Much More Than Just a Column Store," *Proc. VLDB Endowment*, vol. 6, No. 11, 12 pp. (Aug. 2013).
Tsigas et al., "A Simple, Fast Parallel Implementation of Quicksort and its Performance Evaluation on SUN Enterprise 10000," *Parallel, Distributed and Network-Based Processing*, 19 pp. (Feb. 2003).
Willhalm et al., "SIMD-scan: Ultra Fast In-memory Table Scan Using On-chip Vector Processing Units," *Proc. VLDB Endowment*, 10 pp. (Aug. 2009).
Zukowski et. al., "Super-scalar RAM-CPU Cache Compression," *22nd International Conference on Data Engineering (ICDE'06)* 12 pp. (Apr. 2006).
European Search Report dated Feb. 8, 2018, from European Patent Application No. 17001895.6, 13 pp.
Lemke et al., "Speeding Up Queries in Column Stores—A Case for Compression," *Int'l Conf. on Data Warehousing and Knowledge Discovery*, pp. 117-129 (Aug. 2010).
SAP, "HANA Database Lectures," 81 pp. (Mar. 2014).
Büttcher et. al., *Information Retrieval: Implementing and Evaluating Search Engines*, Chapter 2, "Basic Techniques," 51 pp. (Jul. 2010).
Wikipedia, "Heapsort," downloaded from World Wide Web, 12 pp. (document marked: "last modified on Jan. 9, 2017").
Baeza-Yates, et al. *Modern Information Retrieval*, Section "List Intersection," Addison-Wesley, p. 346 (Jan. 2011).
Communication pursuant to Article 94(3) EPC dated Mar. 6, 2019, from European Patent Application No. 17001895.6, 5 pp.
Zobel et al., "Inverted Files for Text Search Engines," *ACM Computing Surveys*, vol. 38, No. 2, pp. 1-56 (Jul. 2006).

\* cited by examiner software 180 implementing one or more innovations for value-ID-based sorting in column-store databases

| employee number | department | city | country |
|---|---|---|---|
| 1001 | corporate | New York City | USA |
| 1002 | corporate | Hamburg | Germany |
| 1004 | sales | NULL | NULL |
| 1005 | R&D | New Delhi | India |
| 1008 | R&D | Seoul | Korea |
| 1010 | products | Hamburg | Germany |
| 1011 | sales | London | UK |
| 1012 | R&D | NULL | NULL |
| 1018 | corporate | New York City | USA |
| 1020 | corporate | Hamburg | Germany |
| 1021 | sales | New Orleans | USA |
| 1025 | HR | NULL | NULL |

FIG. 3 dictionary (320) for department value ID
| 0: | corporate |
| 1: | HR |
| 2: | products |
| 3: | R&D |
| 4: | sales | dictionary (322) for city value ID
| 0: | Hamburg |
| 1: | London |
| 2: | New Delhi |
| 3: | New Orleans |
| 4: | New York City |
| 5: | Seoul |

NULL = 6 (not stored)

dictionary (324) for country value ID
| 0: | Germany |
| 1: | India |
| 2: | Korea |
| 3: | UK |
| 4: | USA |

NULL = 5 (not stored)

FIG. 4      400

| employee number | department | city | country |
|---|---|---|---|
| 1001 | 0 | 4 | 4 |
| 1002 | 0 | 0 | 0 |
| 1004 | 4 | 6 | 5 |
| 1005 | 3 | 2 | 1 |
| 1008 | 3 | 5 | 2 |
| 1010 | 2 | 0 | 0 |
| 1011 | 4 | 1 | 3 |
| 1012 | 3 | 6 | 5 |
| 1018 | 0 | 4 | 4 |
| 1020 | 0 | 0 | 0 |
| 1021 | 4 | 3 | 4 |
| 1025 | 1 | | |

(trailing NULL omitted)   (trailing NULL omitted)

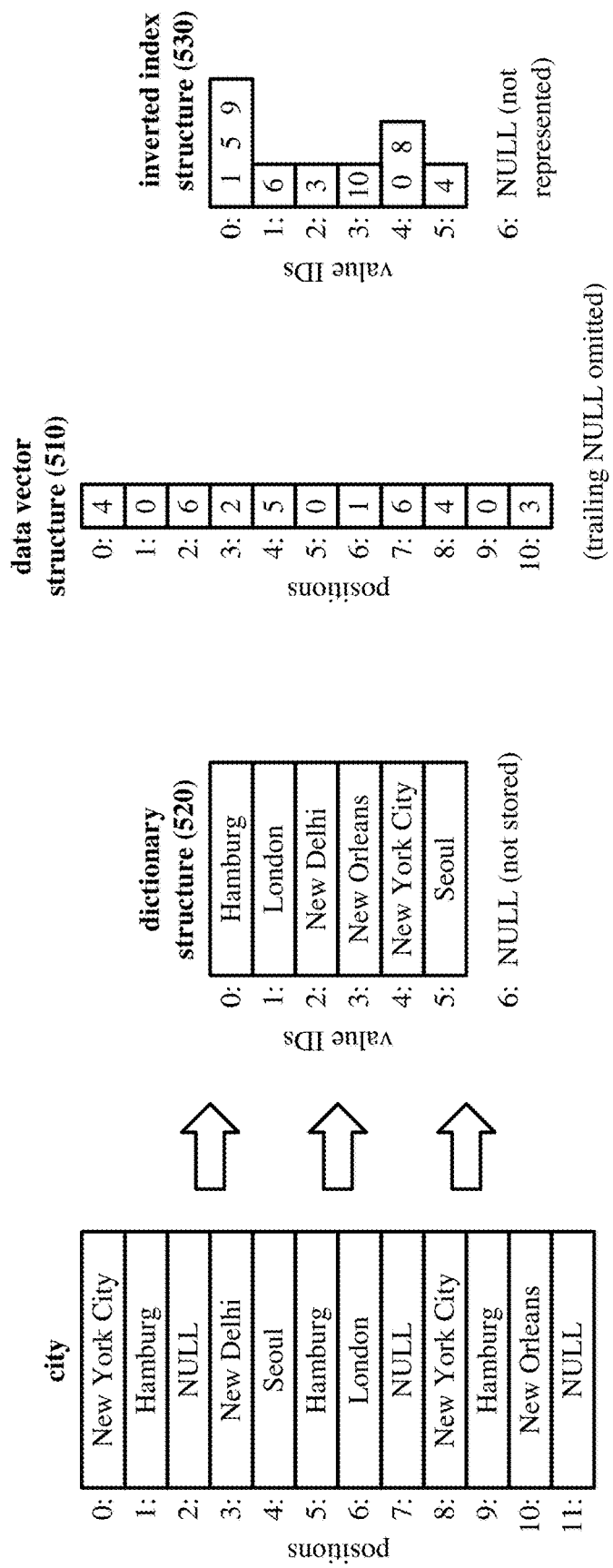

701 sort values of column
- only values at positions 1-3 and 6-11
- return top 7 results (threshold count == 7)
- NULL markers precede non-NULL values

FIG. 7b

702 sort values of column
- only values at positions 1-3 and 6-11
- return top 7 results (threshold count == 7)
- NULL markers precede non-NULL values data vector structure (710) for unsorted values positions – not stored

| 0: | 4 | (New York City) |
| 1: | 0 | (Hamburg) |
| 2: | 6 | (NULL) |
| 3: | 2 | (New Delhi) |
| 4: | 5 | (Seoul) |
| 5: | 0 | (Hamburg) |
| 6: | 1 | (London) |
| 7: | 6 | (NULL) |
| 8: | 4 | (New York City) |
| 9: | 0 | (Hamburg) |
| 10: | 3 | (New Orleans) |
| 11: |   | (NULL)  (trailing NULL omitted) | sorted values (740)

| 2: | 6 | (NULL) |
| 7: | 6 | (NULL) |
| 11: | 6 | (NULL) |
|    |   |        |
|    |   |        |
| 1: | 0 | (Hamburg) |
| 9: | 0 | (Hamburg) |
| 6: | 1 | (London) |
| 3: | 2 | (New Delhi) |

(results after threshold count)

| 8: | 4 | (New York City) |
| 10: | 3 | (New Orleans) |

positions – not stored

| 0: | 1 |
| 1: | 2 |
| 2: | 3 |
| 3: | 6 |
| 4: | 7 |
| 5: | 8 |
| 6: | 9 |
| 7: | 10 |
| 8: | 11 | input structure (720) storing positions to sort, e.g., *in_row_pos*[]

| 0: | 2 |
| 1: | 7 |
| 2: | 11 |
| 3: | 1 |
| 4: | 9 |
| 5: | 6 |
| 6: | 3 | output structure (732) storing sorted values as positions of data vector structure (710)

VALUE-ID-BASED SORTING IN COLUMN-STORE DATABASES

BACKGROUND

A database is an organized collection of data. A database typically organizes data to correspond to how the data is logically arranged. This facilitates operations on the data, for example, looking up values in a database, adding data to the database, sorting the data in the database, or summarizing relevant data in the database. A database management system ("DBMS") mediates interactions between a database, users and applications in order to organize, create, update, capture, analyze and otherwise manage the data in the database.

Some DBMSs have implemented column-oriented storage of data in a database. A database that uses column-oriented storage is a column-store database. A column-store database can include one or more tables. In a column-store database, a table of data is partitioned into separate columns, and the values of each column are stored contiguously in storage or memory. The columns of a table typically have the same length (that is, number of records, or rows). The columns are independent, in that a column does not necessarily have to be written directly after the column that precedes it in the table. Column-oriented storage is efficient when aggregating values in a single column. Column-oriented storage also facilitates compression. Within a column in a database table, values may repeat. In many cases, the number of distinct values in a column is smaller than the number of rows in the table. To reduce how much memory is used to store column data, a DBMS can represent the set of distinct values in a dictionary, which is an auxiliary data structure that maps value identifiers ("value IDs"), often integers, to distinct values. When analyzing data in a column-store database, a user or application may request that a DBMS sort values of a column that have been compressed using a dictionary. Existing approaches to sorting dictionary-compressed values are inefficient in many scenarios, however.

SUMMARY

In summary, the detailed description presents innovations in performing sort operations for dictionary-compressed values of columns in a column-store database using value identifiers ("value IDs"). In many scenarios, the value-ID-based sorting innovations enable rapid, efficient sort operations for the dictionary-compressed values of a column in the column-store database.

According to one aspect of the value-ID-based sorting innovations described herein, a computer system implements a database system that includes a data store and an execution engine. The data store is configured to store values at positions of a column using various structures, including a dictionary structure and an inverted index structure, which is an auxiliary data structure. (Examples of inverted index structures are described below.) The dictionary structure is configured to map distinct values, among the values at the positions of the column, to corresponding value IDs. The inverted index structure is configured to store, for each of the corresponding value IDs mapped to the distinct values in the dictionary structure, a list of those of the positions of the column that contain the distinct value for the value ID. For example, for each of the corresponding value IDs mapped to the distinct values, a list in the inverted index structure includes the (one or more) positions of the column that contain the distinct value associated with the value ID, with the positions being sorted in ascending order. A data vector structure can be configured to store value IDs, selected from the corresponding value IDs mapped to the distinct values in the dictionary structure, to represent the values at the respective positions of the column.

The execution engine is configured to process a request (e.g., for an SQL query or other expression) to sort values at an input set of the positions of the column and identify an output set of the positions of the column for at least some of the sorted values. For example, the input set can be all of the positions of the column (if all of the positions are to be sorted) or a subset of the positions of the column (if only some of the positions are to be sorted). The output set can be all of the input set (if all of the sorted values are returned) or a subset of the input set (if only sorted values up to a threshold count are returned). Of course, the output (sorted) set of positions is potentially reordered relative to the input set of positions.

When processing the request, the execution engine performs operations that include (e.g., as part of a position lookup phase) iterating through at least some positions stored in the lists of the inverted index structure. For each given position that is evaluated (among the positions stored in the lists of the inverted index structure), the execution engine can check if the given position is one of the input set and, if so, add the given position to the output set. When checking if the given position is one of the input set, the execution engine can compare the given position to each of one or more positions of the input set. Or, the execution engine can check a value of a bit vector that indicates whether the positions of the column, respectively, are in the input set. The dictionary structure and inverted index structure are sorted according to a dictionary ordering criterion (e.g., ranking of characters) that matches a sort ordering criterion for a request. Thus, when the execution engine iterates through positions stored in the lists of the inverted index structure, the execution engine checks positions in the sorted order.

In some example implementations, the inverted index structure is configured to store, for a NULL marker as one of the distinct values, a list of those of the positions of the column that contain the NULL marker. During the position lookup phase, the execution engine iterates through the list of those of the positions of the column that contain the NULL marker. In other example implementations, the inverted index structure does not directly represent positions that contain the NULL marker. Instead, as part of a NULL lookup phase, for each given position among the positions of the input set, the execution engine checks if the given position contains the NULL marker and, if so, adds the given position to the output set. For example, to detect an inline NULL marker, the execution engine compares a value ID for the value at the given position to a value ID for the NULL marker. Or, to detect a trailing NULL marker, the execution engine compares the given position to a size of a data vector structure.

After adding a given position to the output set, the execution engine can check if a threshold count of positions has been reached for the output set and, if so, return the output set. Also, after iterating through the positions stored in the lists of the inverted index structure, the execution engine can return the output set.

The value-ID-based sorting innovations can be implemented as part of a method, as part of a computer system configured to perform operations for the method, or as part of one or more computer-readable media storing computer-executable instructions for causing a computer system, when programmed thereby, to perform the operations for the method. The various value-ID-based sorting innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 2 is a diagram illustrating values of a table of an example database.

FIG. 3 is a set of diagrams illustrating dictionaries used in domain coding for the table of the example database of FIG. 2 as a column-store database.

FIG. 4 is a diagram illustrating values of the table of the example database of FIG. 2 after domain coding as a column-store database.

FIG. 5 is a diagram illustrating example structures used to store and access dictionary-compressed values of one of the columns of the table of the example database of FIG. 2.

FIGS. 7a, 7b, and 8 are diagrams illustrating example structures used to sort dictionary-compressed values of the example of FIG. 5.

DETAILED DESCRIPTION

The detailed description presents innovations in performing sort operations for dictionary-compressed values of columns in a column-store database using value IDs. In many scenarios, the value-ID-based sorting innovations enable rapid, efficient sort operations for the dictionary-compressed values of a column in the column-store database.

Various alternatives to the examples described herein are possible. For example, some of the methods described herein can be altered by changing the ordering of the acts described, or by splitting, repeating, or omitting certain acts, etc. The various aspects of the disclosed technology can be used in combination or separately. Different embodiments use one or more of the described value-ID-based sorting innovations. Some of the value-ID-based sorting innovations described herein address one or more of the problems noted in the background. Typically, a given technique/tool does not solve all such problems.

I. Example Computer Systems.

Figure 1:
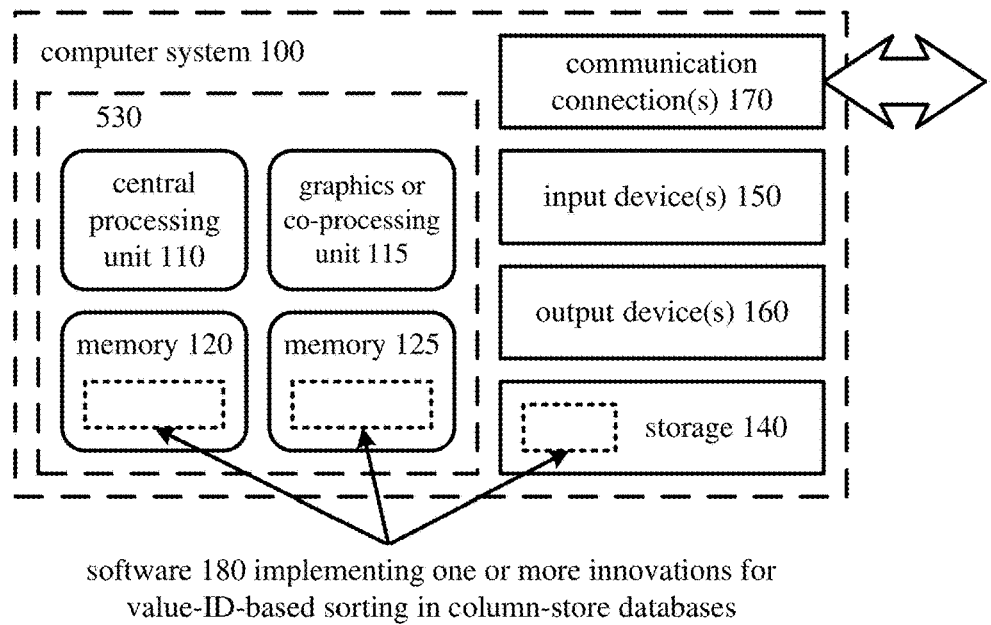
FIG. 1 is a diagram illustrating a generalized computer system in which some embodiments described herein can be implemented.

FIG. 1 illustrates a generalized example of a suitable computer system (100) in which several of the described value-ID-based sorting innovations may be implemented. The computer system (100) is not intended to suggest any limitation as to scope of use or functionality, as the value-ID-based sorting innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a graphics processing unit ("GPU") or co-processing unit (115).

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is accessible to the GPU/co-processing unit (115). The memory (120, 125) stores software (180) implementing one or more innovations for value-ID-based sorting in column-store databases, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations for value-ID-based sorting in column-store databases.

The input device(s) (150) may be a touch input device such as a keyboard, mouse, pen, or trackball, a voice input device, a scanning device, or another device that provides input to the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, or other data in a modulated data signal. A modulated data signal is a signal that has one or more of its characteristics set or changed in such a manner as to encode information in the signal. By way of example, and not limitation, communication media can use an electrical, optical, RF, or other carrier.

The value-ID-based sorting innovations can be described in the general context of non-transitory computer-readable media. Non-transitory computer-readable media are any available tangible media that can be accessed within a computing environment. By way of example, and not limitation, with the computer system (100), non-transitory computer-readable media include memory (120, 125), storage (140), and combinations thereof. As used herein, the term non-transitory computer-readable media does not include transitory signals or propagating carrier waves.

The value-ID-based sorting innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine" and "perform" to describe computer operations in a computer system. These terms are high-level abstractions for operations performed by a computer, and should not be confused with acts performed by a human being. The actual computer operations corresponding to these terms vary depending on implementation.

II. Examples of Dictionary Compression.

In general, a database is an organized collection of data. A database typically organizes data to correspond to how the data is logically arranged. This facilitates operations on the data, for example, looking up values in a database, adding data to the database, sorting the data in the database, or summarizing relevant data in the database. A database management system ("DBMS") mediates interactions between a database, users and applications in order to organize, create, update, capture, analyze and otherwise manage the data in the database.

The terms online transaction processing ("OLTP") and online analysis processing ("OLAP") indicate two different usage patterns for databases. OLTP includes the day-to-day tasks of business, such as order processing for products of a business. Often, OLTP involves simple, repetitive transactions to add data, update data, or remove data in a database. In contrast, OLAP includes analysis of data over a longer period of time in order to support informed decisions, for example, analysis of which of the products are most profitable. Usually, an OLAP system uses data generated in an OLTP system.

Because OLTP systems run fundamental business tasks such as order processing, OLTP systems tend to focus on the performance of operations such as adding data, removing data and updating data. OLTP systems emphasize preserving data integrity in multi-user environments and ensuring that data are up-to-date. Transactions in an OLTP system are expected to be simple and have short run times, and transaction throughput is an important metric. In contrast, because OLAP systems provide tools for analysis and optimization of business processes, OLAP systems tend to focus on the performance of operations such as reading and sorting data. Data for an OLAP system is updated periodically (e.g., from an OLTP system) but not changed in typical OLAP operations. Queries in an OLAP system (e.g., to aggregate or join data) may be complex and long running, and query throughput is an important metric.

Historically, most DBMSs have implemented record-oriented storage of data in a database. A database that uses record-oriented storage is a row-store database. In a row-store database, the values of a tuple (set of elements) in a database relation are stored contiguously in storage or memory. For example, FIG. 2 shows a view (200) of a table of an example database that includes records for employees (in rows), where each record includes values for employee number, department, city, and country. The NULL marker is any defined value that represents the absence of an actual value at a position of the column. In a row-store database, values for employee number, department, city, and country are stored contiguously for the first employee, then values for employee number, department, city, and country are stored contiguously for the second employee, and so on. (1001 corporate New York City USA|1002 corporate Hamburg Germany| . . . ) Record-oriented storage is efficient when inserting a new record or selecting a whole record, since all values of the record can be written or read at once. For this reason, row-store databases are often used in OLTP systems. Operations that involve aggregating values in a single column are not efficient, however, since most values are skipped for records in the row-oriented storage.

Therefore, some DBMSs have implemented column-oriented storage of data in a database. In a column-store database, a table of data is partitioned into separate columns, and the values of each column are stored contiguously in storage or memory. The columns of a table typically have the same length (that is, number of records, or rows). For example, for the values shown in FIG. 2, in a column-store database, values for employee number are stored contiguously for all records (rows), then values for department are stored contiguously for all records, and so on. (1001 1002 1004 . . . |corporate corporate sales . . . | . . . .) The columns are independent, in that a column does not necessarily have to be written directly after the column that precedes it in the table. Column-oriented storage is efficient when aggregating values in a single column. Column-oriented storage also facilitates compression. A sequence of values in one column can usually be compressed more efficiently than a sequence of values for a record. On the other hand, inserting a new record or selecting a whole record in a column-store database involves writing or reading values in multiple columns, which can be inefficient.

To speed up operations that read data from a column-store database, a DBMS can keep column data in system memory. An in-memory database keeps data in system memory, with backups of the data stored in storage (e.g., disk storage). For example, an in-memory column-store database keeps column data in system memory. In contrast, a disk-resident database keeps data in storage, and parts of the data are cached in system memory.

Within a column in a database table, values may repeat. In many cases, the number of distinct values in a column is smaller than the number of rows in the table. To reduce how much memory is used to store column data, a DBMS can represent the set of distinct values in a dictionary. In general, a dictionary includes a sorted list of the unique values in a column. The position of each unique value in the dictionary represents its value identifier ("ID"), which is unique within the dictionary for the column. For the dictionary, a value ID can be transient in the sense that it is not explicitly stored in the dictionary. Rather, a value ID can be calculated from the row positions of a value represented in the dictionary. The dictionary can be implemented as an auxiliary data structure that maps value IDs to distinct values. If the distinct values are strings, the dictionary is called a string dictionary. In some example implementations, the NULL marker is not stored in the dictionary. Instead, the NULL marker is implicitly mapped to the largest value ID for the dictionary: $valueID_{NULL}$=size_of(dictionary). Alternatively, the NULL marker can be explicitly represented in the dictionary, e.g., as an entry at the end of the dictionary.

FIG. 3 shows example dictionaries (320, 322, 324) for the table of the example database of FIG. 2. The dictionary (320) for the department column maps distinct values within the department column to corresponding value IDs. The dictionary (322) for the city column maps distinct values within the city column to corresponding value IDs, and the dictionary (324) for the country column maps distinct values within the country column to corresponding value IDs. The values in the employee number column can also be represented in a dictionary (not shown). The dictionaries (322, 324) for the city and country columns do not explicitly represent the NULL marker. Instead, the NULL marker is implicitly mapped to the largest value ID for the dictionary—value ID 6 for the dictionary (322) for the city column, and value ID 5 for the dictionary (324) for the country column.

Typically, the distinct values in a dictionary are sorted according to a dictionary ordering criterion. In general, a dictionary ordering criterion is any arbitrary, but fixed criterion for sorting the distinct values. For example, the dictionary ordering criterion can be case-insensitive (e.g., a, A, b, B, c, C, . . . ) or case-sensitive (e.g., a, b, . . . , z, A, B, . . . , Z or A, B, . . . , Z, a, b, . . . , z). Aside from establishing a ranking of alphabetic characters, the dictionary ordering criterion can rank numbers and other non-alphabetic characters relative to the alphabetic characters. Depending on implementation or a setting, the dictionary ordering criterion can change. (For value-ID-based sorting as described herein, however, the dictionary ordering criterion matches the sort ordering criterion, which is the criterion used for sorting values in response to a request to sort values (e.g., for an SQL query or other expression).

In the database, values in a column can be replaced with value IDs that represent those values. This process is sometimes called domain encoding or domain coding. FIG. 4 shows a view (400) of the table of the example database of FIG. 2, with values replaced with value IDs from the appropriate dictionaries for the respective columns. A column vector (also called a data vector) is a sequence of value IDs for a column. Thus, a column of values is replaced with a column vector (of value IDs) and a dictionary that maps value IDs to distinct values. If the initial values of a column consume more space than the column vector and dictionary for the column, using the column vector and dictionary achieves compression. This happens, for example, when the average value of the column is larger than an integer (value ID) and the number of distinct values is much smaller than the number of rows. In particular, this is a common scenario for columns of string values.

As shown in FIG. 4, NULL markers at the end of a column (so-called trailing NULL markers) can be omitted from a column vector. Operations like searching or sorting can reconstruct trailing NULL markers from the length of the original column (which is stored as a separate value) and the length of the column vector. Alternatively, trailing NULL markers can be explicitly stored in a column vector.

In some cases, a column vector includes many repeated value IDs. Redundancy among the value IDs of a column vector can be further exploited to reduce how much memory is used to store the column vector. Also, redundancy among distinct values of a dictionary can be further exploited to reduce how much memory is used to store the dictionary.

FIG. 5 shows example structures used to store and access dictionary-compressed values of the city column of the table of the example database of FIG. 2, according to an example columnar value-ID-based storage layout (500). The example structures include a data vector structure (510), a dictionary structure (520), and an inverted index structure (530).

FIG. 5 shows a column of city names. The city names are unsorted string values indexed by position in the column. The column contains nine rows with non-NULL values (actual city names) and three rows with NULL markers.

In FIG. 5, the dictionary structure (520) maps distinct values among the values of the city column to corresponding value IDs. The dictionary structure (520) is indexed by the value IDs, which correspond to positions of entries in the dictionary structure (520). The value IDs are not explicitly stored for the dictionary structure (520). Rather, the value IDs are implied for the positions of the entries of the dictionary structure (520). For instance, Hamburg is assigned value ID 0, London is assigned value ID 1, etc. The NULL marker is not stored in the dictionary structure (520), but instead is implicitly mapped to the largest value ID for the dictionary structure (520): $valueID_{NULL}$=size_of(dictionary)=6. Alternatively, the NULL marker can be explicitly represented in the dictionary structure (520), e.g., as an entry at the end of the dictionary structure (520). Alternatively, a dictionary structure can explicitly store the corresponding value IDs for distinct values, as well as the distinct values themselves.

The data vector structure (510) stores value IDs for the respective values of the column. The value IDs represent a column vector for the column. The data vector structure (510) is indexed by the positions of the column, but the positions are not explicitly stored for the data vector structure (510). Rather, the positions are implied for the entries of the data vector structure (510). Alternatively, a data vector structure can explicitly store the positions of a column, as well as the value IDs for the respective positions of the column.

In some example implementations, a data vector structure does not directly represent any NULL markers at the end of the column (trailing NULL markers). In FIG. 5, for example, the data vector structure (510) omits an entry for the NULL marker at the end of the city column (position 11). Any trailing NULL markers for a column can be reconstructed from the length of the original column, which is stored as a separate value, and the length of the data vector structure. Alternatively, a data vector structure can explicitly store trailing NULL markers for a column.

The dictionary structure (520) and data vector structure (510) provide a memory-efficient and self-contained representation of the values of the city column. To improve the performance of value lookup operations, the example columnar value-ID-based storage layout (500) includes another auxiliary data structure—an inverted index structure (530). In a column-store database, an inverted index is an optional, secondary structure, which may or may not exist for a given column. An inverted index structure can be computed from a value ID sequence (in a column vector)

and dictionary. Typically, an inverted index is created as part of a primary/secondary key definition process, and is associated with a column vector and dictionary for a column. The purpose of an inverted index is to speed up certain types of lookup operations that could also be handled by searching (scanning) the column vector. Conceptually, an inverted index maps each different value ID (for each distinct value represented in a dictionary) to a list of positions in a column vector that contain the value ID (or, equivalently, the list of positions in the column that contain the associated distinct value). In FIG. 5, the inverted index structure (530) is constructed using the dictionary structure (520) and data vector structure (510). The inverted index structure (530) includes a list of positions for each of the non-NULL values in the data vector structure (510). For example, to obtain the positions for value ID 4 in the column vector using the inverted index structure (530), a value lookup operation retrieves the list of positions for value ID 4, which includes positions 0 and 8. Positions 0 and 8 of the data vector structure (510) store value ID 4, which represents the value New York City.

The inverted index structure (510) is indexed by value IDs for distinct values, but the value IDs are not explicitly stored for the inverted index structure (510). Rather, the value IDs are implied for the entries of the inverted index structure (510). Alternatively, an inverted index structure can explicitly store the value IDs for distinct values, as well as the lists of positions associated with the respective value IDs.

In FIG. 5, the NULL marker is not represented in the inverted index structure (530). The inverted index structure (530) records no information about positions of the column that contain the NULL marker (i.e., value ID 6). Alternatively, a NULL marker can be explicitly represented in an inverted index as a list of positions at the end of the inverted index. For example, for the inverted index structure (530) shown in FIG. 5, the NULL marker can be explicitly represented as a list of positions at the end of the inverted index structure (530) for value ID 6: positions 2, 7, and 11.

In an inverted index, in the list of positions for a value ID (for a distinct value), positions are sorted in ascending order. In the inverted index structure (530) of FIG. 5, for example, the list of positions for value ID 0 is 1, 5, 9, and the list of positions for value ID 4 is 0, 8. In some example implementations, sorted positions are a property of inverted index structures.

In addition to reducing memory usage, domain encoding has several other advantages. For example, searching for the occurrence of a value in a column can be performed using integer comparisons on the value IDs of the column vector. Integer comparisons are usually faster than string comparisons. On the other hand, sort operations using conventional sorting algorithms such as quick sort and heap sort can be slow. Section IV describes variations of value-ID-based sorting that are efficient for column-store databases having a layout such as the example columnar value-ID-based storage layout (500) shown in FIG. 5.

III. Example Architectures for Value-ID-Based Sorting in Column-Store Databases.

Figure 6:
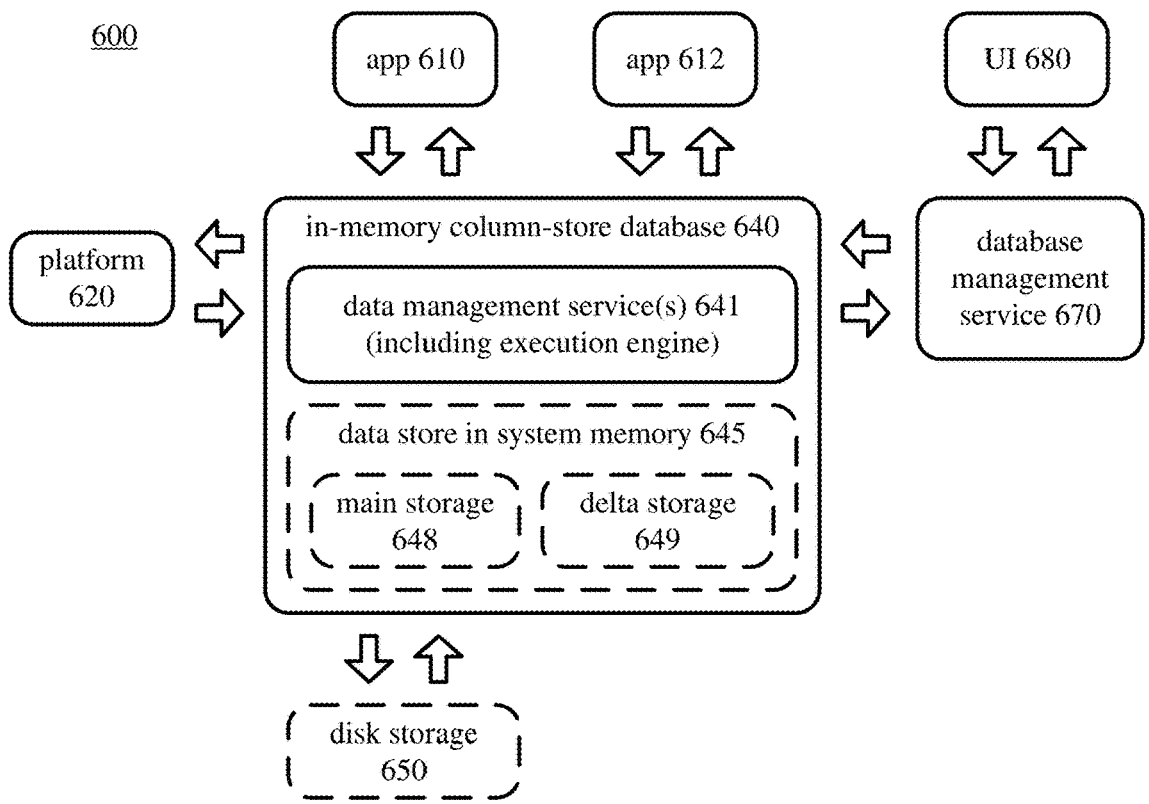
FIG. 6 is a diagram illustrating an example architecture for value-ID-based sorting of dictionary-compressed values of columns in a column-store database.

FIG. 6 shows an example architecture (600) for value-ID-based sorting of dictionary-compressed values of columns of an in-memory column-store database (640). The architecture (600) can support OLTP and/or OLAP processes for the in-memory column-store database (640), but this section emphasizes sort operations and query processing for OLAP processes. In addition to the in-memory column-store database (640) and supporting services, the architecture can include a row-store database and supporting services (not shown).

The applications (610, 612) interact with the in-memory column-store database (640). For example, an application can provide analytical services, transaction processing services, reporting services, dashboard services, or other services to a user. The applications (610, 612) interact with the database (640) using structured queries or other expressions. Although FIG. 6 shows two applications, the architecture can include more or fewer applications. The architecture (600) also includes one or more platforms (620), which can be a data warehousing service that exposes OLAP services to a user or application.

The database management service (670) provides administration services and access to settings of the in-memory column-store database (640). The user interface (680) mediates interactions between the database management service (670) and a user or application, for example, to configure the in-memory column-store database (640) or set user preferences for sort operations.

Within the in-memory column-store database (640), the data management service(s) (641) manage transactions with the main storage (648) (also called read-optimized store) and the delta storage (649) (also called write-optimized store), which together provide a data store in system memory (645). The data management service(s) (641) can provide a calculation/planning engine, modeling services, real-time replication services, data integration services and/or other services. In particular, an execution engine of the data management service(s) (641) receives and processes requests to sort dictionary-compressed values at positions of columns using one or more of the value-ID-based sorting innovations described herein. A request to sort dictionary-compressed values can be associated with execution of an SQL query or other expression, from a source internal or external to the in-memory column-store database (640).

The main storage (648) supports fast read access to column data of the database (640) in system memory (645) for OLAP queries or OLTP queries. A read operation accesses both the main storage (648) and delta storage (649), which includes any recently changed data that has not yet been incorporated into the main storage (648). The column data in the main storage (648) is backed up to disk storage (650). The disk storage (650) stores column data even when the column data cannot fit in the main storage (648), but accessing column data in the disk storage (650) is much slower than accessing column data in the main storage (648) in system memory (645). The change data in the delta storage (649) is also backed up to disk storage (650), so that changes survive events such as database failures, downtimes, etc.

The main storage (648) can store column data in compressed form. After domain encoding, value IDs within a data vector for a column (column vector) are compressed. The value IDs can be compressed using prefix encoding, Lempel-Ziv compression, run length encoding, cluster encoding, sparse encoding, indirect encoding, bit vector encoding, a combination of the preceding techniques or another compression technique. On a column-by-column basis, the compression technique that is applied to value IDs of a column vector can be selected when the dictionary is constructed or reconstructed (e.g., during a delta merge operation). Also, the dictionary used for a column in the domain encoding can be compressed. The execution engine can apply one or more innovations as described herein when performing sort operations to value IDs of column data in the main storage (648).

For OLTP queries, the database (640) supports write operations. The write operations are not performed directly on the main storage (648), which is read-only. Instead, the database (640) uses delta storage (649) for write operations, which can be update operations or insert operations. In general, an insert operation adds a row to a table, including values in each of the columns of the table. An update operation changes the value in one or more columns for a row of a table. The delta storage (649) resides in system memory (645), with periodic backup to the disk storage (650). Column data in the delta storage (649) may be domain encoded using dictionary compression, but the value IDs for column data in the delta storage (649) are not compressed, and the dictionary used for the delta storage (649) is not compressed. For the delta storage (649), dictionary compression is not order preserving (e.g., new values are added at the end of the dictionary used for a column in the delta storage (649)).

The delta storage (649) can be merged with the main storage (648). Such a delta merge operation can happen automatically, if the delta storage (649) exceeds a specified size, or manually. In the delta merge operation, the dictionary used for a column in the main storage (648) is combined with the dictionary used for the column in the delta storage (649), and a new data vector for the column (new column vector) is created. The value IDs in the new column vector can be compressed, and the new dictionary can be compressed. During a delta merge operation, a second delta storage (not shown) is created to support further write accesses. During the delta merge operation, a read operation accesses the main storage (648), the delta storage (649) and the second delta storage.

When sorting the dictionary-compressed values of a column, the execution engine limits sort operations to positions of the column that are valid (that is, have not been changed by any update operation). To this end, a component in the data management service(s) (641) can track which rows of a table have been updated using a bit vector or other structure that includes a flag value per row. Different bit vectors can be managed for the main storage (648) and the delta storage (649). The component of the data management service(s) (641) can limit read operations and sort operations to valid rows of the table. Thus, concerns about transactional visibility/validity due to deletions, updates, etc. can be addressed by limiting sort operations to valid rows, which is managed by a component outside of the data store (645). The exact mechanism that provides point-in-time consistent views (e.g., multi-version concurrency control) depends on implementation.

In some example implementations, when sorting the dictionary-compressed values of a column, the execution engine applies sort operations as described herein to values of the column in the main storage (648), but ignores data for the column in the delta storage (649) that results from update or insert operations since the last delta merge operation. The main storage (648) typically contains the vast majority of data for columns (e.g., more than 98% for common usage scenarios). Sorting column data in the main storage (648) can consume a significant amount of resources, so sort optimizations for the main storage (648) are beneficial. Also, column data in the main storage (648) that has been invalidated (e.g., due to an update operation recorded in the delta storage (649)) is already excluded from the sort operations, since sort operations are limited to valid rows of a table, as explained above.

Alternatively, when sorting the dictionary-compressed values of a column, the execution engine can account for the effects of update operations and insert operations in the delta storage (649). For example, the execution engine applies sort operations as described herein to values of the column in the main storage (648), but also sorts values in the delta storage (649) for the column using another sorting approach. Although the dictionary for the delta storage (649) is not sorted, its values can be sorted on demand using the dictionary ordering criterion for the dictionary in the main storage (648). Similarly, the value IDs for a column vector in the delta storage (649) can be sorted. The execution engine can then reconcile the results of sorting the main storage (648) and the results of sorting the delta storage (649), e.g., combining results up to a threshold count.

Or, when sorting the dictionary-compressed values of a column, the execution engine can account for the effects of update operations and insert operations in the delta storage (649) by initiating a delta merge operation (which creates a new dictionary, column vector, etc.), and then applying sort operations as described herein to values of the column in the main storage (648) using a new inverted index.

IV. Examples of Value-ID-Based Sorting in Column-Store Databases.

This section describes various innovations in performing sort operations for dictionary-compressed values of columns in a column-store database using value IDs. In many scenarios, the value-ID-based sorting innovations enable rapid, efficient sort operations for the dictionary-compressed values of a column in the column-store database. The column-store database can have a layout such as the example columnar value-ID-based storage layout (500) shown in FIG. 5, which is commonly used in column-store databases, or can have another layout.

The value-ID-based sorting innovations can be used with a dictionary compression scheme as described with reference to FIGS. 2-5 or with another dictionary compression scheme that produces column vectors of value IDs and satisfies certain criteria, including the availability of an inverted index. The value-ID-based sorting innovations use an inverted index to simplify sort operations. Positions in an inverted index are traversed to speed up sort operations for dictionary-compressed values. Also, the criterion used to sort/order characters (e.g., case-sensitive, case-insensitive) is the same for the dictionary/inverted index and the sort operations, such that an ordered traversal of the inverted index is consistent with the sort ordering criterion for the sort operations.

Compared to generic value-based sorting algorithms, benefits of the value-ID-based sorting innovations in some example implementations include: (1) avoiding expensive operations to unpack dictionary-compressed values prior to sorting; (2) using an inverted index to enable highly efficient sorting; (3) providing a simple way to stop sorting when a threshold count of results has been reached, which is particularly helpful for certain queries (e.g., SQL queries with LIMIT/OFFSET parameters); and (4) skipping steps of sort operations for columns without NULL markers, which further improves performance. To summarize, value-ID-based sorting innovations described herein can significantly reduce the processing load for sort operations when an inverted index is available for dictionary-compressed values. Reducing the processing load for sort operations not only speeds up handling of requests to sort column-store data—it can also contribute to the general scalability and efficiency of a database system.

A. EXAMPLES OF REQUESTS, SORT INTERFACES, AND STRUCTURES USED FOR SORTING

During execution of an SQL plan or other expressions, a component of a column-store database may process a request to retrieve sort results from a dictionary-compressed, column-store representation of values for a column. This can be a crucial yet time-consuming step of execution of the SQL plan or other expressions. The sort results can be final results or intermediate results for execution of the SQL plan or other expressions.

For example, a user interested in a list of all cities starting with 'New,' sorted by country, might pose (e.g., through an application) the following SQL query:
--query 1:
SELECT COUNTRY, CITY
FROM CITY_LIST
WHERE CITY LIKE "New %"
ORDER BY COUNTRY In some cases, sorting is requested in SQL only to provide results in an unambiguous order, whatever that might be. This implies that the user can chose an arbitrary sort ordering criterion (e.g., case-sensitive sorting, case-insensitive sorting). Also, in some cases, the user is only interested in chunks/windows of N consecutive sort results (rows) rather than all sort results. To accommodate such a request, results may be sorted partially as opposed to totally like in query 1. An example SQL query incorporating such options is:
--query 2:
SELECT COUNTRY, CITY
FROM CITY_LIST
WHERE CITY LIKE "New %"
ORDER BY COUNTRY LIMIT 5 OFFSET 10—return sorted rows 11 to 15 WITH PARAMETERS ('LOCALE'='CASE_INSENSITIVE')—custom sort criterion In this example, the OFFSET parameter indicates a starting position (row) for the sort results to return, and the LIMIT parameter indicates how many results to return. The LOCALE parameter indicates a sort ordering criterion for sort operations.

A component of a column-store database can expose an interface having a method called for a sort operation. Such a method can be called by another component that manages SQL plan execution. For example, a C++ interface sort( ) can include multiple input parameters as follows.

| Input Parameter | Description |
| --- | --- |
| in_row_pos | A list of positions of the column vector (col_vec[ ]) to sort. The positions within the list are unique, in that each position appears at most one time in the list. The positions are represented with integers and are sorted in ascending order. For example, in_row_pos[ ] is [1, 2, 3, 6, 7] for the $2^{nd}$, $3^{rd}$, $4^{th}$, $7^{th}$, and $8^{th}$ positions of the column vector. The positions that are available to sort are provided from outside the sorting process, as the positions of the column that are visible in the current transactional context. Thus, the sort operation need not address visibility/validity. |
| in_locale | A string value containing the sort locale (i.e., sort ordering criterion). For example, the sort locale is case-sensitive or case-insensitive. |
| in_max_results | An integer value specifying a threshold count of results (e.g., maximum number of result rows) to generate. For example, for SQL queries with a LIMIT/OFFSET clause, in_max_results indicates a threshold count of OFFSET + LIMIT. (Sort results may be further filtered to the count of LIMIT.) For SQL queries without a LIMIT/OFFSET clause, in_max_results indicates the size of the column vector (col_vec[ ]). |
| in_nulls_first | A Boolean value indicating whether NULL markers shall precede all other (non-NULL) values in the sort results. If in_nulls_first is true, NULL markers precede all other (non-NULL) values in the sort results. If in_nulls_first is false, NULL markers follow all other (non-NULL) values in the sort results. |
| in_max_row_pos | An integer value indicating the size of the original column vector, which is used to reconstruct trailing NULL markers if the column vector has been truncated (does not explicitly store such trailing NULL markers). |

The sort( )method can be implemented using value-ID-based sorting as described below. The sort( )method returns an output parameter out_indices[ ], which is a list of indices into the input parameter in_row_pos[ ]. The output parameter out_indices[ ] includes a threshold count (in_max_results) of sort results. The results in out_indices[ ] are sorted by corresponding value ID. Specifically, for any two indices i and j of out_indices[ ], where $0 \leq i < j \leq size\_of(out\_indices[ ])-1$), the value ID corresponding to index i is less than or equal to the value ID corresponding to index j: col_vec[in_row_pos[out_indices[i]]]≤col_vec[in_row_pos[out_indices[j]]].

Alternatively, a sort( )method of an interface exposed by a component of a column-store database can have other and/or additional parameters. Or, a sort( )method of an interface exposed by a component of a column-store database can have fewer parameters. For example, the list of positions to sort can be implied or pre-defined (e.g., all positions) rather than explicitly indicated as an input parameter. Or, as another example, the threshold count of results can be implied or pre-defined (e.g., no limit) rather than explicitly indicated with an input parameter.

Figure 7A:

FIG. 7a shows an example (701) of sort operations and structures used to sort the dictionary-compressed values of the example of FIG. 5. In the example (701), input parameters of a sort( ) method as described above indicate options for the sorting process.

A data vector structure (710) stores unsorted values for the column of city names. The values and value IDs in the data vector structure (710) are the same as the data vector structure (510) shown in FIG. 5, but, for the sake of illustration, an entry is shown for the trailing NULL marker. Also, for the sake of illustration, the corresponding values are shown although such values are not actually stored in the data vector structure (710). The input parameter in_row_pos[ ] indicates values at positions 1-3 and 6-11 of the column should be sorted. Such positions are shown as shaded in the data vector structure (710), and the corresponding values are shown in boldface. An input structure (720) in FIG. 7a is indexed by values 0 to 8 and stores values 1-3 and 6-11 for the to-be-sorted positions, respectively, of the data vector structure (710).

Another input parameter indicates the threshold count of results to return from the sort operations. In the example of FIG. 7a, the threshold count is 7 (in_max_results is 7). A third input parameter indicates that NULL markers precede non-NULL values in the sort results (in_nulls_first is true). Thus, NULL markers are considered smaller than all non-NULL values.

FIG. 7a also shows, conceptually, the results of sorting—sorted values (740), with the values of the city column sorted at the to-be-sorted positions, up to the threshold count. The first three values are the NULL markers at positions 2, 7, and 11, since in_nulls_first is true. After that, two values for Hamburg (value ID 0) at positions 1 and 9 follow. After that, a value for London (value ID 1) at position 6 and a value for New Delhi (value ID 2) at position 3 follow. Values for to-be-sorted positions after the threshold count (a value for New York City at position 8 and a value for New Orleans at position 10) are shown separately. Values for positions that were not sorted (at positions 0, 4, and 5, which were not in in_row_pos) are not shown at all. The non-NULL values among the sorted values (740) form an ascendingly ordered sequence of values: Hamburg, Hamburg, London, and New Delhi, having value IDs 0, 0, 1, and 2, respectively.

The sorted values (740) are not expressly returned as output in the example of FIG. 7a. Rather, the sorted values are encoded and returned as positions of sorted values in an output structure (730). Specifically, the positions of sorted values in the output structure (730) are indices of the input structure (720), which thereby indirectly indicate positions of the data vector structure (710) (and column). For example, position 1 of the output structure (730) stores the index 4, which indicates position 4 of the input structure (720), which in turn stores position 7 of the data vector structure (710) (and column) In some example implementations, the positions of sorted values are returned as the output parameter out_indices[ ], which includes a sequence of indices into in_row_pos[ ]. The referenced positions of in_row_pos[ ] represent the sorted sequence of positions. For example, out_indices[1] is 4, which refers to the fifth element of in_row_pos[ ]. The fifth element of in_row_pos[ ] in turn contains the position of the eighth element of the data vector structure (710): in_row_pos[4] is 7). The eighth element of the data vector structure (710) is a value ID (6) for a NULL marker. The size of out_indices[ ] is in_max_results, meaning that only the first in_max_results sorted rows are returned.

FIG. 7b shows another example (702) of sort operations and structures used to sort the dictionary-compressed values of the example of FIG. 5. In the example (702) of FIG. 7b, the input parameters of a sort( )method, the data vector structure (710), the input structure (720) storing positions to sort, and the sorted values (740) are the same as in FIG. 7a. The sort results are represented in a different manner, however. In FIG. 7b, instead of storing indices of the input structure (720), an output structure (732) stores positions of sorted values as positions of the column that are represented in the input structure (720). For example, position 1 of the output structure (732) stores position 7 of the data vector structure (710) (and column). In this way, the sort results directly indicate the positions of sorted values of the column.

B. EXAMPLE IMPLEMENTATIONS OF SORT OPERATIONS

Although various sorting algorithms (e.g., quick sort, heap sort) can be used to sort dictionary-compressed values reliably, such algorithms are slow in many scenarios. Value-ID-based sort operations as described herein can provide much faster performance in columnar value-ID-based storage layouts with an inverted index available.

In some example implementations (in which an inverted index does not record positions of a column that contain the NULL marker), the value-ID-based sort operations include two phases: a NULL lookup phase and a position lookup phase. If NULL markers precede non-NULL values in the sort results (in_nulls_first is true), the NULL lookup phase is performed before the position lookup phase. If NULL markers follow non-NULL values in the sort results (in_nulls_first is false), the NULL lookup phase is performed after the position lookup phase. In other example implementations (in which an inverted index records positions of a column that contain the NULL marker), the value-ID-based sort operations include only the position lookup phase. In such implementations, since the NULL marker is handled as one of the distinct values of the dictionary and inverted index, a separate NULL lookup phase is not needed.

The NULL lookup phase and position lookup phase fill an output structure that indicates positions of the sort results, up to a threshold count of positions. In some example implementations, the NULL lookup phase and position lookup phase populate a vector of positions (out_indices[ ]) with the threshold count of positions, as indicated by in_max_results. Initially, out_indices[ ] is empty. The property out_indices.size, which tracks the number of elements in out_indices[ ] is set to zero. Calling the method add_and_check( ) adds a new element to out_indices[ ] and checks whether to continue the sort operations.

```
add_and_check(int element, vector<int>& out_indices[ ], int
in_max_results)
{
    out_indices.append(element);
    if (out_indices.size( ) == in_max_results) {
        // DONE: finish sorting and return out_indices[ ] to user
    }
    // CONTINUE processing
}
```

In add_and_check( ) the call to out_indices.append(element) adds the value element to the vector out_indices[ ] and increments the value of out_indices.size. The value element can be an index of in_row_pos[ ] (as described with reference to FIG. 7a) or a position of the column (as described with reference to FIG. 7b). The value of out_indices.size is compared to in_max_results (example of threshold count). If the threshold count has been reached, the sort operations finish and the sort results (represented in out_indices[ ]) are returned.

1. Example Implementations for NULL Lookup Phase.

In the NULL lookup phase, the execution engine determines which of the to-be-sorted positions, if any, of the column contain the NULL marker. For example, the execution engine loops over the to-be-sorted positions represented in in_row_pos[ ]. In general, for each position (given position) of the to-be-sorted positions represented in in_row_ pos[ ], the execution engine checks whether the value ID of the column vector (col_vec[ ]) at the given position equals the value ID for the NULL marker. That is, the execution engine checks if:

$$\text{col\_vec}[\text{in\_row\_pos}[i]] == \text{valueID}_{NULL} \text{ for } i=\text{size\_of}(\text{in\_row\_pos}[ ])-1.$$

If the given position satisfies the condition, the execution engine adds the value i to the structure that indicates positions of the sort results. That is, for each value i that satisfies the condition, the execution engine calls add_and_check(i, out_indices[ ], in_max_results) to append i to out_indices[ ]. In this example, out_indices[ ] stores indices to in_row_pos[ ]. Positions that contain NULL markers are added to the beginning of out_indices[ ] if in_nulls_first is true. Positions that contain NULL markers are added to the end of out_indices[ ] if in_nulls_first is false.

An inline NULL marker is a NULL marker: (a) at the beginning of a column, (b) in the middle of a column (anywhere after the beginning and before the last non-NULL value), or (c) after the last non-NULL value if NULL markers are not pruned. In some example implementations, a column includes at least one inline NULL marker if size_of(col_vec[ ])>count$_{non\_NULL\_pos}$, where count$_{non\_NULL\_pos}$ is a statically known and separately stored value indicating the count of non-NULL values in the column with column vector col_vec[ ], which is potentially truncated.

A trailing NULL marker is a NULL marker at the end of a column which has been omitted from explicit representation in the column vector of value IDs. In some example implementations, a column has at least one trailing NULL marker if size_of(col_vec[ ])<in_max_row_pos. That is, if the number of elements in the column with the column vector (including non-NULL values and inline NULL markers) is less than the number of elements in the original column, then there is at least one trailing NULL marker.

When evaluating whether to-be-sorted positions of the column contain the NULL marker, the execution engine can check for inline NULL markers and trailing NULL markers using different approaches. For each value i in in_row_pos[i], the execution engine evaluates whether the position contains an inline NULL marker by checking whether col_vec[in_row_pos[i]]==valueID$_{NULL}$. The execution engine evaluates whether the position for value i contains a trailing NULL marker by checking whether in_row_pos[i]≥size_of(col_vec[ ]). If the execution engine determines that a column does not contain any trailing NULL markers (e.g., by checking that size_of(col_vec[ ])==in_max_row_pos), the execution engine can skip the tests for whether the respective positions represented in in_row_pos[ ] contain a trailing NULL marker, which speeds up the NULL lookup phase. If the execution engine determines that a column does not contain any inline NULL markers (e.g., by checking that size_of(col_vec[ ])==count$_{non\_NULL\_pos}$), the execution engine can skip the tests for whether the respective positions represented in in_row_pos[ ] contain an inline NULL marker, which speeds up the NULL lookup phase.

The NULL lookup phase can finish early if the threshold count of sort results is reached.

Also, as previously noted, the NULL lookup phase can be skipped completely if the NULL marker is handled as one of the distinct values of the dictionary and inverted index. In this case, positions containing the NULL marker are identified in the position lookup phase.

2. Example Implementations for Position Lookup Phase.

In the position lookup phase, the execution engine sorts the to-be-sorted positions of the column vector. For example, the execution engine iterates through lists of positions for an inverted index and compares the respective positions from the lists to positions represented in in_row_pos[ ]. An inverted index structure, indexed by value ID, can include a list for each distinct non-NULL value. The list includes positions of the column vector that contain that value ID (which correspond to positions of the column that contain the distinct value). The execution engine evaluates the respective lists of an inverted index structure in order, starting from the list associated with value ID 0 and continuing until the list associated with the last value ID is processed or a threshold count of results is reached. The execution engine gets a list list$_i$ from the inverted index structure:

$$\text{list}_i = \text{inverted\_index}[i], \text{ for value ID } i=0, \ldots, \text{valueID}_{NULL}-1.$$

For a given list list$_i$, the execution engine tests the one or more positions in the list to determine whether the respective position(s) are represented in in_row_pos[ ]. The execution engine iteratively evaluates each of the positions in the given list list$_i$. The execution engine gets a position positions$_{ij}$ from the given list list$_i$:

$$\text{position}_{ij} = \text{list}_i[j], \text{ for } j=0 \text{ to size\_of}[\text{list}_i]-1.$$

There are several different approaches to testing whether the positions of the lists of the inverted index are represented in in_row_pos[ ].

According to a first approach, the execution engine checks if there is a matching position at index k in in_row_pos[ ]. The execution engine sequentially checks if:

$$\text{position}_{ij} == \text{in\_row\_pos}[k], \text{ for any } k \text{ from 0 to size\_of}(\text{in\_row\_pos}[ ])-1.$$

If the execution engine finds a matching position at index k, the execution engine calls add_and_check(k, out_indices[ ], in_max_results) to append k to out_indices[ ]. The first approach is potentially slow, as it may require sequential comparisons at many positions of in_row_pos[k] for a given position position$_{ij}$.

According to a second approach, the execution engine creates a temporary bit vector as an auxiliary data structure. The temporary bit vector (bit_vector) is a sequence of one-bit flag values that has the same number of elements as the column vector. That is, size_of(bit_vector)==size_of(col_vec[ ]). The flag value at bit_vector[m] is 1 if m is a member of in_row_pos[ ]. Otherwise, the flag value at bit_vector[m] is 0. Thus, the temporary bit vector indicates, for each of the positions of the column vector, a yes/no decision for whether that position is in in_row_pos[ ]. The cost of creating the temporary bit vector is small (O(n)), and the cost of checking a flag value is even smaller (O(1)). The execution engine uses the temporary bit vector to test whether a position position$_{ij}$ retrieved from a list list$_i$ of the inverted index is included in the to-be-sorted positions. That is, the execution engine checks whether bit_vector[position$_{ij}$]==1. If so, the position position$_{ij}$ is one of the to-be-sorted positions. Otherwise (bit_vector[position$_{ij}$]==0), the position position$_{ij}$ is not one of the to-be-sorted positions.

Figure 8:
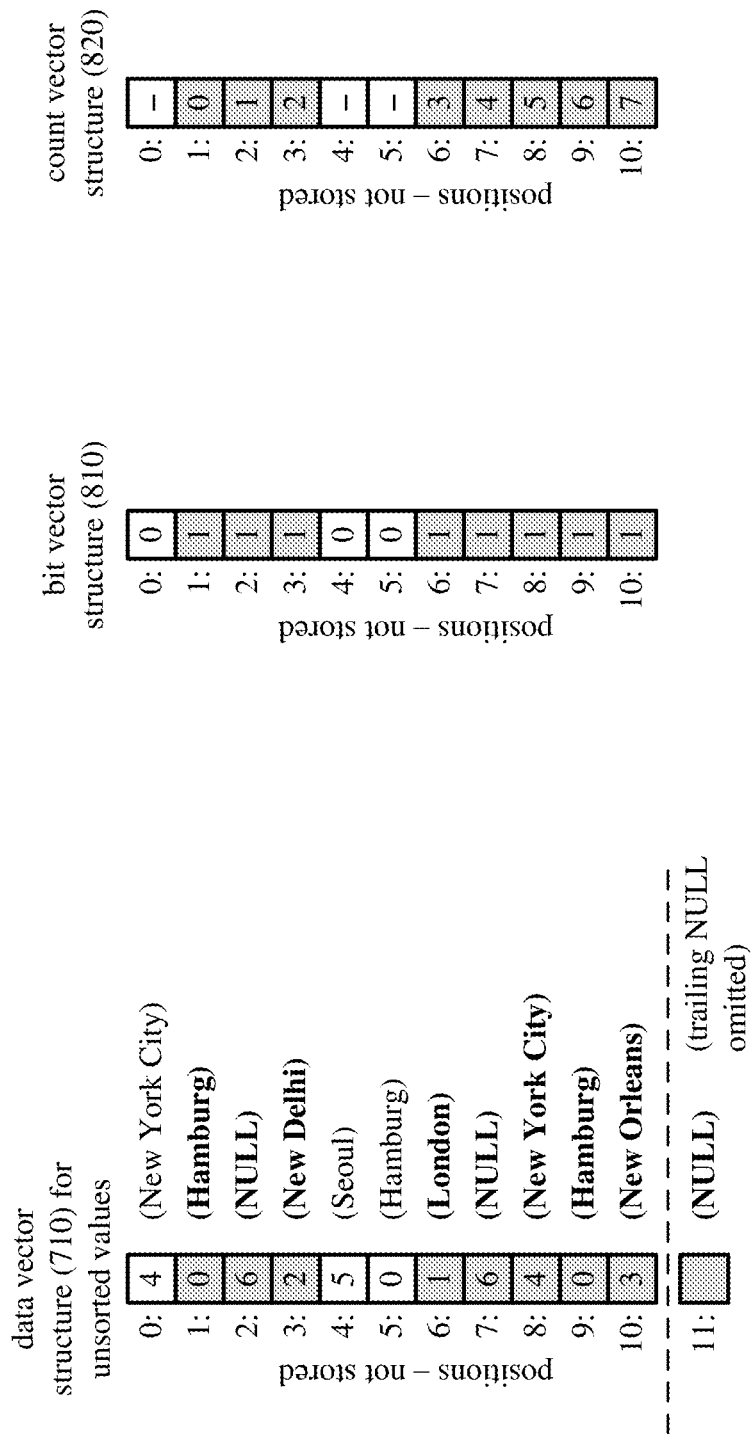

FIG. 8 shows an example temporary bit vector for the data vector shown in FIGS. 5, 7a, and 7b. The bit vector structure (810) includes a one-bit value for each of the positions of the data vector structure (710). If a given position of the data vector structure (710) is to be sorted (shown as highlighted), the value of the corresponding position of the bit vector structure (810) is 1. Otherwise, if a given position of the data vector structure (710) is not to be sorted, the value of the corresponding position of the bit vector structure (810) is 0. The execution engine can uses the bit vector structure (810) to test whether a position retrieved from a list of the inverted index is included in the to-be-sorted positions. For example, for position 3, the execution engine checks whether bit_vector[3]==1, and determines that position 3 is one of the positions to be sorted. Compared to the first approach (which includes sequential comparisons with positions represented in in_row_pos[ ]), test operations in the second approach are much faster.

In the second approach, after the execution engine uses the temporary bit vector to determine that a position is included in the to-be-sorted positions, the execution engine calculates a matching position in the to-be-sorted positions. For example, when bit_vector[position$_{ij}$]==1, the execution finds a matching position at index k in in_row_pos[ ] for position$_u$. To find k, the execution engine calculates on-the-fly the number of preceding bits in the temporary bit vector, starting from position 0 and continuing through position$_u$.

$$k = \sum_{n=0}^{r-1} \text{bit\_vector}[n] - 1, \text{ where } r \text{ is position}_{ij}.$$

The cost or calculating K is relatively small (O(n)), and will be performed at most in_max_results times. The calculation of k can be optimized for an x86 processor using POPCNT instructions, which are described in Intel® 64 and IA-32 Architectures Software Developer's Manual (June 2016) and AMD64 Technology AMD64 Architecture Programmer's Manual Volume 3: General-Purpose and System Instructions, revision 3.22 (June 2015). After finding the matching position at index k, the execution engine calls add_and_check(k, out_indices[ ], in_max_results) to append k to out_indices[ ].

According to a third approach, the execution engine uses a temporary bit vector (as in the second approach) to test whether a position position$_{ij}$ retrieved from a list list$_i$ of the inverted index is included in the to-be-sorted positions. The execution engine creates a temporary count vector as an auxiliary data structure. The temporary count vector (count_vector) is a sequence of integer values that can have the same number of elements as the column vector. The integer value at count_vector[m] is defined if position m is a member of in_row_pos[ ]. Otherwise, the integer value at count_vector[m] is not defined. When the integer value at count_vector[m] is defined (that is, m is a member of in_row_pos[ ]), the integer value indicates the matching position at index k associated with the position m in in_row_pos[ ]. Compared to the second approach, in the third approach the values for different indices k are pre-calculated and stored in the count vector for all positions r=0, . . . , size_of(bit_vector)−1. Lookup operations for k are fast, at the cost of computations to determine the values stored in the count vector. After the execution engine determines that a position position$_{ij}$ is included in the to-be-sorted positions represented in in_row_pos[ ], the execution engine uses the temporary count vector to find the matching position at index k. After finding the matching position at index k, the execution engine calls add_and_check(k, out_indices[ ], in_max_results) to append k to out_indices[ ].

FIG. 8 shows an example temporary count vector for the data vector shown in FIGS. 5, 7a, and 7b and bit vector structure (810) shown in FIG. 8. The count vector structure (820) potentially includes a count value for each of the positions of the data vector structure (710), although count values are only defined for positions to be sorted. Thus, when bit_vector[m]==1, count_vector[m] stores the index k of in_row_pos[ ] for that position m. For example, for position 3, after the execution engine determines that position 3 is one of the positions to be sorted (bit_vector[3]==1), the execution engine finds the matching position's index 2 at (count_vector[3]=2). The execution engine calls add_and_check(2, out_indices[ ], in_max_results) to append k to out_indices[ ].

According to a fourth approach, after the execution engine determines (using a temporary bit vector as in the second approach or otherwise) that a position is included in the to-be-sorted positions, the execution engine adds the position to the sort results. For example, after the execution engine determines that a position position$_{ij}$ is included in the to-be-sorted positions represented in in_row_p[ ], the execution engine calls add_and_check(position$_{ij}$, out_indices[ ], in_max_results) to append positions to out_indices[ ]. In this approach, out_indices[ ] stores positions of the column vector (as opposed to indices of in_row_pos[ ]).

As previously noted, if the NULL marker is handled as one of the distinct values of the dictionary and inverted index, positions containing the NULL marker are identified in an iteration of the position lookup phase.

C. TECHNIQUES FOR VALUE-ID-BASED SORTING

Figure 9:
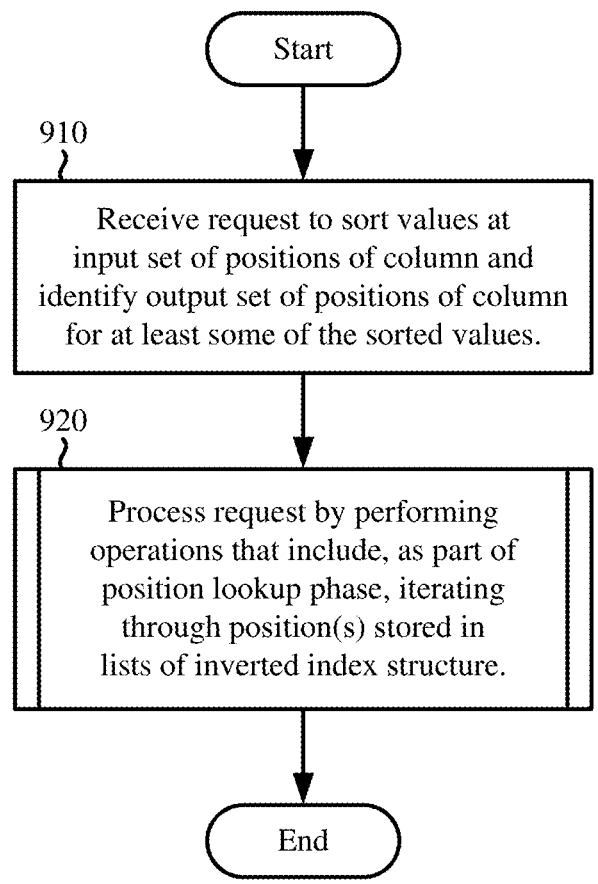
FIG. 9 is a flowchart illustrating a generalized technique for value-ID-based sorting of dictionary-compressed values of a column in a column-store database.

FIG. 9 shows a generalized technique (900) for value-ID-based sorting of dictionary-compressed values of a column in a column-store database. An execution engine as described with reference to FIG. 6 or other execution engine can perform the technique (900).

In the context of the technique (900), a database system includes a data store and the execution engine. The data store is configured to store values at positions of a column using various structures, including a dictionary structure and an inverted index structure. The dictionary structure is configured to map distinct values, among the values at the positions of the column, to corresponding value IDs. In the dictionary structure, the value IDs can be implied (as indices of the dictionary structure) or explicitly stored. The inverted index structure is configured to store, for each of the corresponding value IDs mapped to the distinct values in the dictionary structure, a list of those of the positions of the column that contain the distinct value for the value ID (e.g., positions sorted in ascending order that contain the distinct value). In the inverted index structure, the value IDs can be implied (as indices of the inverted index structure) or explicitly stored. The various structures of the data store can also include a data vector structure, which is configured to store value IDs, selected from the corresponding value IDs mapped to the distinct values in the dictionary structure, to represent the values at the positions of the column. In the data vector structure, the positions can be implied (as indices of the data vector structure) or explicitly stored. In a list in the inverted index structure for a given value ID/distinct value, the stored positions of the column that contain the distinct value are also the positions of the data vector structure that contain the given value ID.

The execution engine is configured to perform various operations for sorting. With reference to FIG. 9, the execution engine receives (910) a request to sort values at an input set of positions of the column and identify an output set of positions of the column for at least some of the sorted values. The request can be specified using multiple parameters. For example, as further detailed in section IV.A, the multiple parameters can include: (1) a first input parameter that indicates the input set; (2) a second input parameter that indicates a sort ordering criterion (the dictionary structure and inverted index structure are sorted according to a dictionary ordering criterion that matches the sort ordering criterion for the request); (3) a third input parameter that indicates a threshold count of results to return; (4) a fourth input parameter that indicates whether NULL markers precede or follow non-NULL values; and (5) a fifth input parameter that indicates size of the column. Alternatively, the multiple parameters include other and/or additional input parameters, or include fewer parameters. For example, the input set for the request can be implied or pre-defined (e.g., all positions) rather than explicitly indicated as an input parameter. As another example, a threshold count for the request can be implied or pre-defined (e.g., no limit) rather than explicitly indicated with an input parameter. In response to the request, the execution engine can return an output parameter that indicates the output set.

The input set of positions can be all of the positions of the column or a subset of the positions of the column (e.g., indicated with an input parameter such as in_row_pos[ ], as described above). In general, the input set of positions is a list of one or more positions among the positions of the column. The output set of positions can be all of the input set of positions or a subset of the input set of positions. In any case, due to the sorting, the output set of positions is potentially reordered relative to the input set of positions. Depending on implementation, the output set of positions can be a list of one or more indices for positions of the input set (e.g., indices of an input structure such as in_row_pos [ ], as described with reference to FIG. 7a) or a list of one or more positions of the column in the input set (e.g., as described with reference to FIG. 7b).

Figure 10:
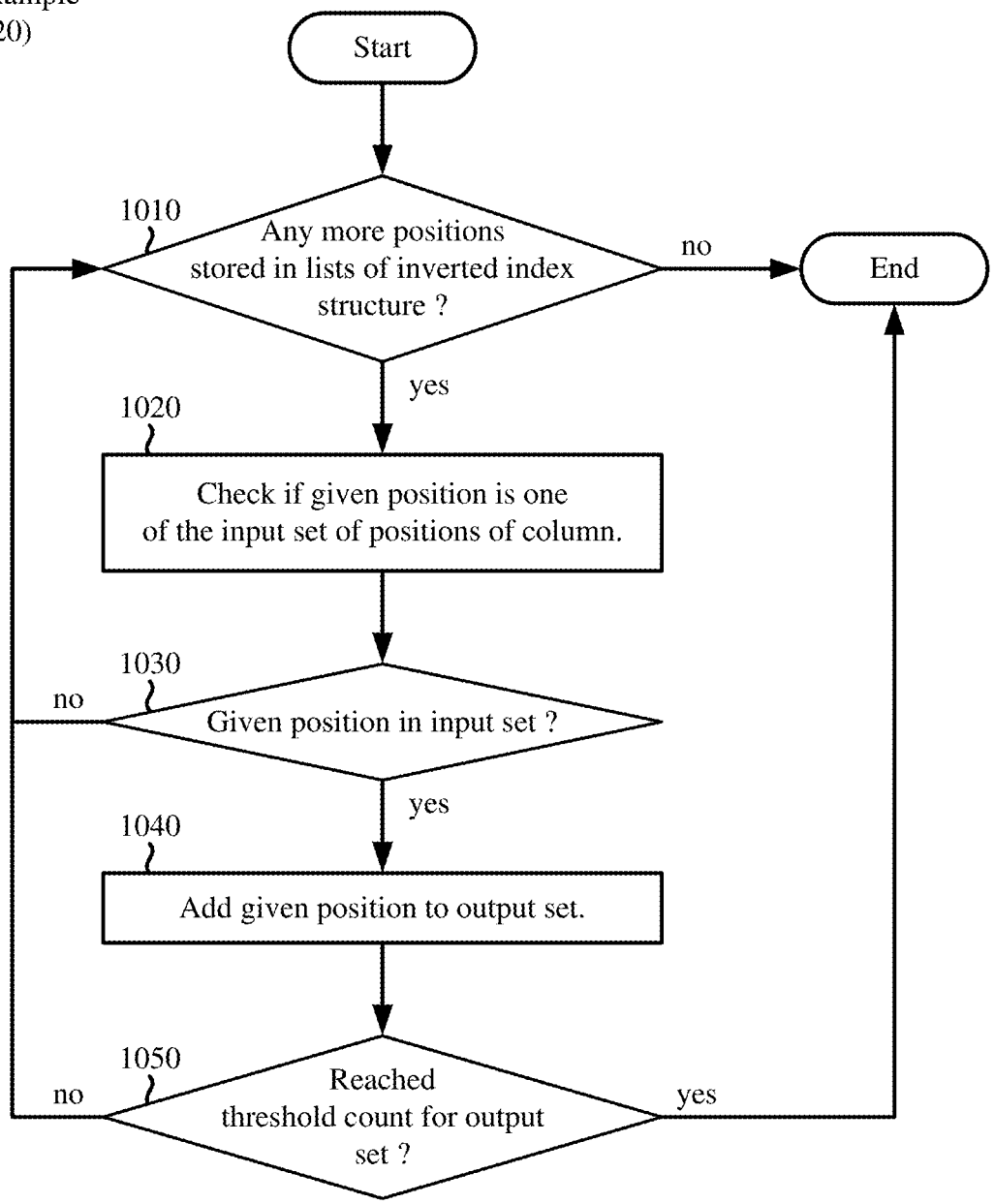
FIG. 10 is a flowchart illustrating an example technique for evaluating positions of lists of an inverted index structure as part of a position lookup phase.

The execution engine processes (920) the request. In doing so, the execution engine performs operations that include (e.g., as part of a position lookup phase) iterating through at least some positions stored in the lists of the inverted index structure. FIG. 10 shows an example technique (1000) for evaluating positions of lists of an inverted index structure as part of a position lookup phase.

With reference to FIG. 10, the execution engine determines (1010) if there are any more positions stored in lists of the inverted index structure. If not ("no" branch at decision 1010), the position lookup phase ends. Otherwise, there is at least one position stored in the lists of the inverted index structure ("yes" branch at decision 1010). In this case, for the next position (given position), the execution engine checks (1020) if the given position is one of the input set of positions of the column. For example, to check if the given position is one of the input set, the execution engine compares the given position to each of one or more positions of the input set, stopping if the given position is found in the input set or the end of the input set is reached. Or, as another example, to check if the given position is one of the positions in the input set, the execution engine checks a value of a bit vector (e.g., a bit vector as described with reference to FIG. 8). The bit vector indicates whether the positions of the column, respectively, are in the input set.

If the given position is one of the input set of positions of the column ("yes" branch at decision 1030), the execution engine adds (1040) the given position to the output set of positions of the column (which are also positions of the column vector). For example, the execution engine adds the given position to the output set as one of the positions of the column/column vector (as in the example of FIG. 7b). Or, the execution engine adds the given position to the output set as an index for one of the positions (matching position) of the input set (as in the example of FIG. 7a). The execution engine can use a bit vector to calculate the index of the matching position among the positions of the input set (as described with reference to FIG. 8). Or, the execution engine can use a count vector to calculate the index of the matching position among the positions of the input set (as described with reference to FIG. 8). The count vector maps the positions of the column/column vector to indices of the positions in the input set.

The execution engine determines (1050) if a threshold count of positions has been reached for the output set. If so ("yes" branch at decision 1050), the position lookup phase ends. On the other hand, if the threshold count of positions has not been reached for the output set ("no" branch at decision 1050), or if the given position is not in the input set ("no" branch at decision 1030), the execution engine determines (1010) if there are any more positions stored in lists of the inverted index structure, and continues from that point.

Figure 11:
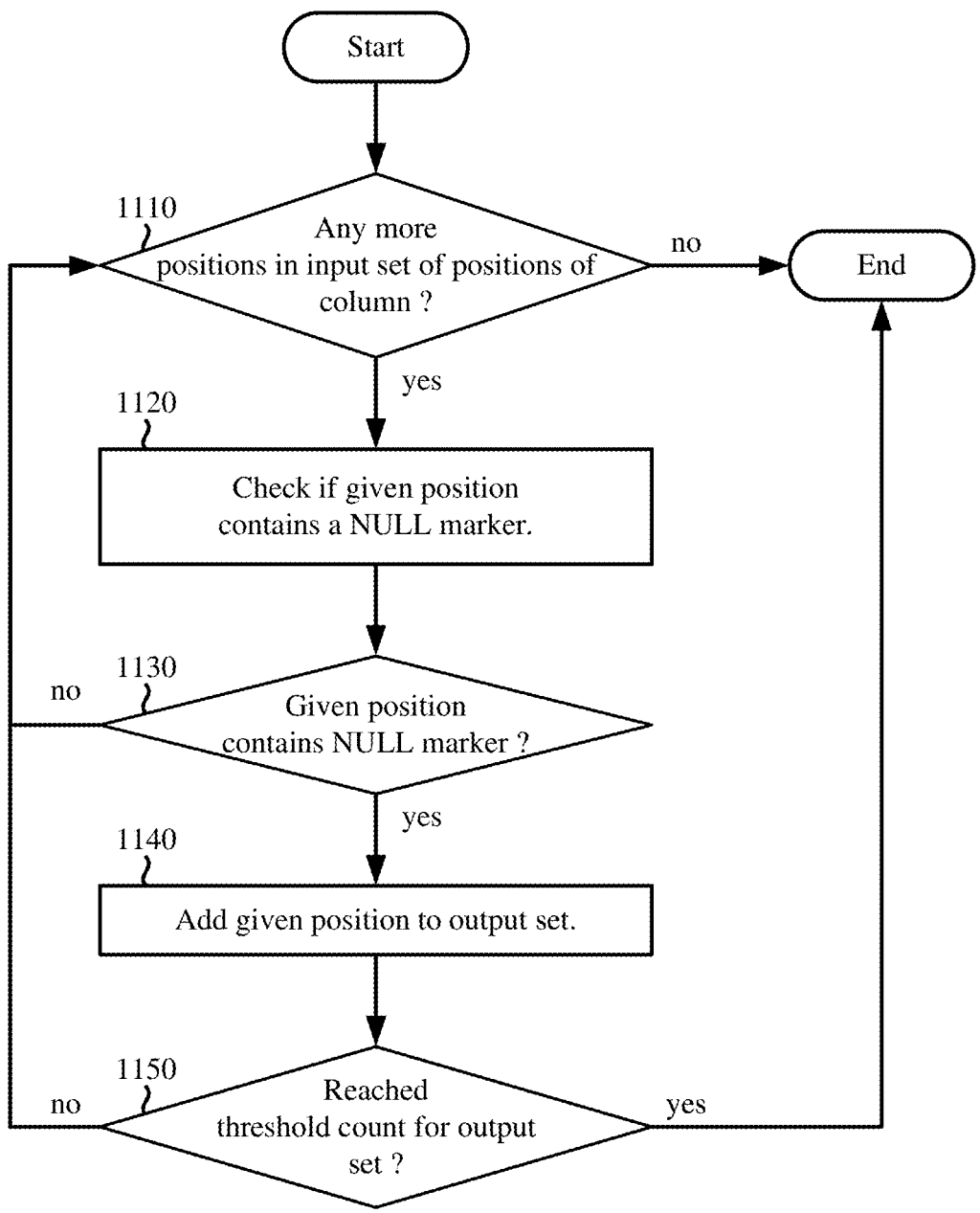
FIG. 11 is a flowchart illustrating an example technique for evaluating whether positions of a column contain a NULL marker as part of a NULL lookup phase.

When processing (920) the request, the execution engine can also perform operations for a NULL lookup phase. FIG. 11 shows an example technique (1100) for evaluating whether positions of a column contain a NULL marker as part of the NULL lookup phase.

With reference to FIG. 11, the execution engine determines (1110) if there are any more positions in the input set of positions of the column. If not ("no" branch at decision 1110), the NULL lookup phases ends. Otherwise, there is at least one position left in the input set of positions of the column ("yes" branch at decision 1110). In this case, for the next position (given position), the execution engine checks (1120) if the given position contains a NULL marker. For example, to detect an inline NULL marker (among the values at the positions of the column), the execution engine compares a value ID for the value at the given position to a value ID for the NULL marker. Or, to detect a trailing NULL marker (among the values at the positions of the column), the execution engine compares the given position to a size of a data vector structure. If the given position is at least as large as the size of the data vector structure, the given position contains a trailing NULL marker.

If the given position contains a NULL marker ("yes" branch at decision 1130), the execution engine adds (1140) the given position to the output set of positions of the column (which are also positions of the column vector, except for a trailing NULL marker). For example, the execution engine adds the given position to the output set as one of the positions of the column/column vector (as in the example of FIG. 7b). Or, the execution engine adds the given position to the output set as an index for one of the positions (matching position) of the input set (as in the example of FIG. 7a).

The execution engine determines (1150) if a threshold count of positions has been reached for the output set. If so ("yes" branch at decision 1150), the NULL lookup phase ends. On the other hand, if the threshold count of positions has not been reached for the output set ("no" branch at decision 1150), or if the given position does not contain the NULL marker ("no" branch at decision 1130), the execution engine determines (1110) if there are any more positions in the input set of positions of the column, and continues from that point.

Alternatively, the execution engine implements the position lookup phase and/or the NULL lookup phase in some other way.

Also, in some example implementations, instead of performing operations in a NULL lookup phase, the execution engine processes NULL markers in the same way it processes non-NULL values. That is, the inverted index structure is configured to store, for a NULL marker as one of the distinct values, a list of those of the positions of the column that contain the NULL marker. During the position lookup phase, the execution engine iterates through the list of those of the positions of the column that contain the NULL marker.

With reference to FIG. 9, after iterating through the at least some positions stored in the lists of the inverted index structure, the execution engine returns the output set of the positions of the column.

D. ALTERNATIVES AND EXTENSIONS

In many of the preceding examples, values of a single column are sorted at one time. Alternatively, values of multiple columns can be sorted in one operation (multi-column sort). For example, values of a first column are sorted using an inverted index structure for value IDs of the first column, and values of a second column are sorted using an inverted index structure for value IDs of the second column. The overall results can be sorted first using the results of sorting the first column and then, for positions having the same value ID for the first column, using the results of sorting the second column. An input parameter can indicate the positions of rows to be sorted for the multiple columns. Another input parameter can indicate an overall threshold count for results returned by the multi-column sort. Other input parameters can indicate sort locales (sort ordering criteria) for the respective columns to be sorted, whether NULL markers precede or follow non-NULL values, and sizes of the column vectors for the respective columns.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units and a memory, wherein the computer system implements a database system comprising:
    a data store configured to store values at positions of a column using structures that comprise:
        a sorted dictionary structure configured to map distinct values, among the values at the positions of the column, to corresponding value IDs, the distinct values being sorted in the sorted dictionary structure according to a first sort criteria; and
        a sorted inverted index structure, sorted according to the first sort criteria, comprising a plurality of sequential elements, each sequential element of the plurality of sequential elements representing a value ID, each sequential element of the plurality of sequential elements configured to store, for each of the corresponding value IDs mapped to the distinct values in the sorted dictionary structure, a list of those of the positions of the column that contain that distinct value for the value ID, at least one of the lists comprising a plurality of column positions, wherein a number of sequential elements in the sorted inverted index structure is equal to a number of value IDs in the sorted dictionary structure; and
    an execution engine configured to process a request to sort, using the first sort criteria, values for an input set of the positions of the column and identify an output set of the positions of the column for at least some of the sorted values, by performing operations that include, as part of sorting the values at the input set of the positions of the column, iterating through at least some positions stored in the lists of the inverted index structure, the iterating comprising, for a first sequential element of the sorted inverted index structure:
        determining a first column position specified in the list for the first sequential element;
        determining that the first column position specified in the list is a member of the input set of the positions of the column by checking whether the positions of the columns, respectively, are in the input set;
        adding the first column position to the output set; and
        analyzing a second column position specified in the list for the first sequential element to determine whether the second column position specified in the list for the first sequential element is a member of the input set of the positions of the column.

2. The computer system of claim 1, wherein the structures further comprise:
    a data vector structure configured to store value IDs, selected from the corresponding value IDs mapped to the distinct values in the sorted dictionary structure, to represent the values at the positions of the column.

3. The computer system of claim 1, wherein the operations further comprise:
    after iterating through the at least some positions stored in the lists of the sorted inverted index structure, returning the output set.

4. The system of claim 3, wherein the output set is returned without iterating through the entire sorted inverted index structure.

5. The computer system of claim 1, wherein the operations further include, during the iterating:
    determining that a threshold count of positions has been reached for the output set; and
    returning the output set in response to determining that the threshold count of positions has been reached.

6. The computer system of claim 1, wherein determining that the first column position specified in the list for the first sequential element is a member of the input set of positions of the column comprises comparing the first column position to each of one or more positions of the input set of column positions.

7. The computer system of claim 1, wherein determining that the first column position specified in the in the list for the first sequential element is a member of the input set of positions of the column comprises checking a value of a bit vector that indicates whether the positions of the column, respectively, are in the input set.

8. The computer system of claim 7, wherein the first column position is added as an index of a matching position among the positions of the input set, and wherein the operations further comprise:

using the bit vector to calculate the index of the matching position among the positions of the input set.

9. The computer system of claim 7, wherein the first column position is added as an index of a matching position among the positions of the input set, and wherein the operations further comprise:
using a count vector to calculate the index of the matching position among the positions of the input set, wherein the count vector maps the positions of the column to indices of the positions in the input set.

10. The computer system of claim 1, wherein the operations further include, as part of a NULL lookup phase, for each given position among the positions of the input set:
checking if the given position contains a NULL marker; and
if so, adding the given position to the output set.

11. The computer system of claim 10, wherein the checking if the given position contains the NULL marker comprises:
to detect an inline NULL marker among the values at the positions of the column, comparing the value at the given position to the NULL marker; or
to detect a trailing NULL marker among the values at the positions of the column, comparing the given position to a size of a data vector structure that is configured to store value IDs, selected from the corresponding value IDs mapped to the distinct values in the sorted dictionary structure, to represent the values at the positions of the column.

12. The computer system of claim 1, wherein:
The sorted inverted index structure is configured to store, for a NULL marker as one of the distinct values, a list of those of the positions of the column that contain the NULL marker; and
the position lookup phase includes iterating through the list of those of the positions of the column that contain the NULL marker.

13. The computer system of claim 1, wherein, for each of the corresponding value IDs mapped to the distinct values in the sorted dictionary structure, the one or more of the positions that contain the distinct value for the value ID are sorted in ascending order in the list for the value ID.

14. The computer system of claim 1, wherein:
the input set is all of the positions of the column or a subset of the positions of the column; and
the output set is all of the input set or a subset of the input set, wherein the output set is potentially reordered relative to the input set.

15. The computer system of claim 1, wherein:
the input set is a list of one or more positions among the positions of the column; and
the output set is:
a list of one or more positions of the column in the input set; or
a list of one or more indices for positions of the input set.

16. The computer system of claim 1, wherein:
the request is specified using multiple input parameters that include:
a first input parameter that indicates the input set;
a second input parameter that indicates a sort ordering criterion;
a third input parameter that indicates a threshold count of results to return;
a fourth input parameter that indicates whether NULL markers precede or follow non-NULL values; and
a fifth input parameter that indicates size of the column; and
the execution engine is further configured to return, as a response to the request, an output parameter that indicates the output set.

17. One or more non-transitory computer-readable media storing computer-executable instructions for causing a computer system, when programmed thereby, to perform sorting, for a data store configured to store values at positions of a column using structures that comprise:
(i) a sorted dictionary structure configured to map distinct values, among the values at the positions of the column, to corresponding value IDs, the distinct values being sorted in the sorted dictionary structure according to a first sort criteria; and
(ii) a sorted inverted index structure, sorted according to the first sort criteria, comprising a plurality of sequential elements, each sequential element of the plurality of sequential elements representing a value ID, each sequential element of the plurality of sequential elements configured to store, for each of the corresponding value IDs mapped to the distinct values in the dictionary structure, a list of those of the positions of the column that contain the distinct value for the value ID, at least one of the lists comprising a plurality of column positions, wherein a number of sequential elements in the sorted inverted index structure is equal to a number of value IDs in the sorted dictionary structure;
wherein the sorting comprises:
receiving a request to sort values for an input set of the positions of the column and identify an output set of the positions of the column for at least some of the sorted values; and
processing the request by performing operations that include, as part of sorting the values at the input set of the positions of the column, iterating through at least some positions stored in the lists of the inverted index structure, the iterating comprising, for a first sequential element of the sorted inverted index structure:
determining a first column position specified in the list for the first sequential element;
determining that the first column position specified in the list is a member of the input set of the positions of the column by checking whether the positions of the columns, respectively, are in the input set;
adding the first column position to the output set; and
analyzing a second column position specified in the list for the first sequential element to determine whether the second column position specified in the list for the first sequential element is a member of the input set of the positions of the column.

18. The one or more non-transitory computer-readable media of claim 17, wherein the structures further comprise:
a data vector structure configured to store value IDs, selected from the corresponding value IDs mapped to the distinct values in the sorted dictionary structure, to represent the values at the positions of the column.

19. The one or more non-transitory computer-readable media of claim 17, wherein the checking if the first column position is one of the input set comprises checking a value of a bit vector that indicates whether the first column position, respectively, is in the input set.

20. The one or more non-transitory computer-readable media of claim 17, wherein, for each of the corresponding value IDs mapped to the distinct values in the sorted dictionary structure, the one or more of the positions that contain the distinct value for the value ID are sorted in ascending order in the list for the value ID.

21. The one or more non-transitory computer-readable media of claim 17, the instructions further comprising, during the iterating:
   determining that a threshold count of positions has been reached for the output set; and
   returning the output set in response to determining that the threshold count of positions has been reached.

22. A method, implemented in a computer system that includes a data store configured to store values at positions of a column using structures that comprise:
   (i) a sorted dictionary structure configured to map distinct values, among the values at the positions of the column, to corresponding value IDs, the distinct values being sorted in the sorted dictionary structure according to a first sort criteria; and
   (ii) a sorted inverted index structure, sorted according to the first sort criteria, comprising a plurality of sequential elements, each sequential element of the plurality of sequential elements representing a value ID, each sequential element of the plurality of sequential elements configured to store, for each of the corresponding value IDs mapped to the distinct values in the dictionary structure, a list of those of the positions of the column that contain the distinct value for the value ID, at least one of the lists comprising a plurality of column positions, wherein a number of sequential elements in the sorted inverted index is equal to a number of value IDs in the sorted dictionary structure;
the method comprising:
   receiving a request to sort values for an input set of the positions of the column and identify an output set of the positions of the column for at least some of the sorted values; and
   processing the request by performing operations that include, as part of sorting the values at the input set of the positions of the column, iterating through at least some positions stored in the lists of the inverted index structure, the iterating comprising, for a first sequential element of the sorted inverted index structure:
      determining a first column position specified in the list for the first sequential element;
      determining that the first column position specified in the list is a member of the input set of the positions of the column by checking whether the positions of the columns, respectively, are in the input set;
      adding the first column position to the output set; and
      analyzing a second column position specified in the list for the first sequential element to determine whether the second column position specified in the list for the first sequential element is a member of the input set of the positions of the column.

23. The method of claim 22, wherein the structures further comprise:
   a data vector structure configured to store value IDs, selected from the corresponding value IDs mapped to the distinct values in the sorted dictionary structure, to represent the values at the positions of the column.

24. The method of claim 22, wherein the checking if the first column position is one of the input set includes checking a value of a bit vector that indicates whether the positions of the column, respectively, are in the input set.

25. The method of claim 22, wherein, for each of the corresponding value IDs mapped to the distinct values in the sorted dictionary structure, the one or more of the positions that contain the distinct value for the value ID are sorted in ascending order in the list for the value ID.

26. The method of claim 22, further comprising, during the iterating:
   determining that a threshold count of positions has been reached for the output set; and
   returning the output set in response to determining that the threshold count of positions has been reached.

27. The method of claim 26, wherein the output set is returned without iterating through the entire sorted inverted index structure.

28. The method of claim 22, further comprising iterating through multiple column positions specified in a list for at least a second sequential element of the sorted inverted index structure.

29. The method of claim 22, wherein the list for at least one sequential element of the sorted inverted index structure consists of a single column position.

30. The method of claim 22, wherein the output set is returned after iterating through the entire sorted inverted index structure.

* * * * *